Figure 1:
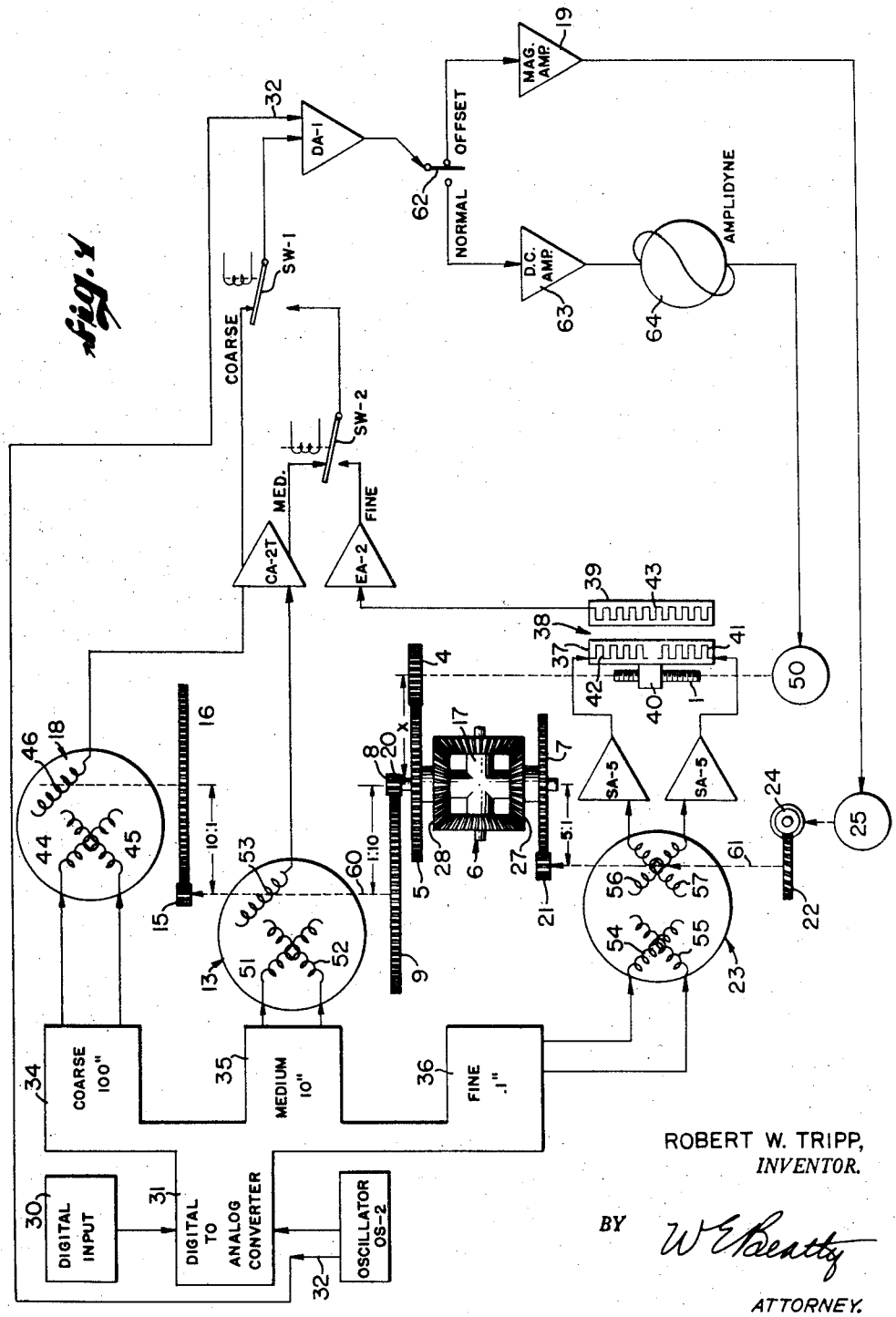

ROBERT W. TRIPP,
INVENTOR.

BY W. E. Beatty

ATTORNEY.

United States Patent Office 2,950,427
Patented Aug. 23, 1960

2,950,427

ZERO OFFSET FOR MACHINE TOOL CONTROL

Robert W. Tripp, Bronxville, N.Y., assignor to Inductosyn Corporation, Carson City, Nev., a corporation of Nevada Filed Feb. 7, 1957, Ser. No. 638,722

15 Claims. (Cl. 318—19)

The invention relates to a zero offset for machine tool control, and more particularly to the feature of changing the location of the program zero with respect to the machine coordinates so that the work piece may be programmed in advance and located on the machine subsequently. The difference between the machine coordinate zero and the work piece coordinate zero is referred to as the "zero offset."

While a digital-to-analog type of input is illustrated by way of example, the machine tool control may have any other suitable type of input, such as resolver, analog or other type of positional command. In any event, the invention deals particularly with a servo control having data elements having different scale factors such as coarse and fine, or preferably coarse, medium and fine, for positioning the tool or driven element in accordance with the positional command.

One object of the invention is to offset these data elements of different scale factors in proportion to their scale factors, to provide the zero offset referred to above.

In the preferred case, the fine data element is a linear position measuring transformer known as the Inductosyn, while the coarse and medium data elements may be rotary resolvers.

POSITION MEASURING TRANSFORMER

The invention provides for positioning or moving the linear machine drives with great accuracy. In the embodiment to be described, this is accomplished by employing linear position measuring transformers as the fine data elements in servo systems controlled by these data elements. The medium and coarse data elements may be conventional two-pole resolvers or they may be position measuring transformers of the type described and claimed in patent application Ser. No. 536,464, filed, September 26, 1955, by R. W. Tripp, now Patent No. 2,900,612, Aug. 18, 1959, the fine data element being preferably a position measuring transformer of the type described in patent application S.N. 509,168, filed, May 18, 1955, by R. W. Tripp and J. L. Winget, Patent 2,799,835, patented July 16, 1957, both cases being assigned to the assignee of the present application.

Such a position measuring transformer used as a fine data element may comprise two inductively related metallic conductor patterns on glass members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

Such fine data position measuring transformers are similar in action to a resolver, but have a larger number of poles. The pole spacing may be one-tenth inch which corresponds to 360 electrical degrees. Experience indicates that it is possible to control positioning to an electrical angle of one milli-radian (on a 54-pole rotary transformer, one milli-radian is equivalent to four seconds of arc); the positioning control of the linear transformer is therefore $\frac{1}{6280}$ of one-tenth inch, or approximately 16 microinches. The realizable accuracy of linear transformers of this type is of the order of one ten-thousandth of an inch.

INSTALLATION OF INDUCTOSYN

Scale

The stationary member of the linear fine data transformer is referred to as a scale, the movable member being referred to as a slider.

It is assumed that a suitable flat surface is provided on the machine tool bed for the mounting of the scale and that this surface is provided with a raised step, or bar, parallel to the direction of motion of the slider for aligning the scale. The scale is mounted on the bed with its metal bars on the top face. The scale is secured to the bed at its center by a clamping screw through the drilled hole and also at its center by an edge clamp pressing against the bevel. The scale is positioned by pressing the scale by means of the edge clamp toward the aligning bar so its contacts securely with it and then clamping the edge clamp screw and the central scale clamping screw. These two screws are first to be coated with glyptal No. EC-1309 so that a very slight amount adheres to the glass at the edge of the hole and at the edge of the clamp. The glyptal will prevent the screws from coming loose. After the glyptal hardens, the screw can be removed with moderate force by a screw driver.

Slider

The slider is mounted with its silver bars facing the silver bars of the scale and spaced therefrom a distance of from .005" to .010". The slider is attached to the moving carriage by means of a clamping screw and two edge clamps (the two edge clamps may be omitted if desired). The screws are glyptalled in the same manner as the screws for the scale.

Additional scales

After the first scale is positioned on the machine, the next scale is set adjacent to it and separated from it approximately .004". Before finally clamping this scale into place the carriage should be moved so that the slider covers equal amounts of the ends of the two scales. A vacuum tube voltmeter or other null indicator is used. The carriage is brought to null with respect to the first scale. The first scale is disconnected. The second scale is connected and, without having moved the carriage, the second scale is adjusted to null. The two scales are then in proper relation to each other.

According to the invention, differentials are introduced between the data elements and the machine, with provision for setting these differentials to the desired offset values. These differentials may be electrical, mechanical, or both. According to the embodiment which illustrates the invention, an electrical differential is used with the linear fine data element, a mechanical differential being provided for the medium and coarse data elements.

For further details of the invention reference may be made to the drawings wherein Fig. 1 is a schematic view of a zero offset control according to the present invention, some of the gearing being omitted and shaft drives being referred to by broken lines.

Figure 2:
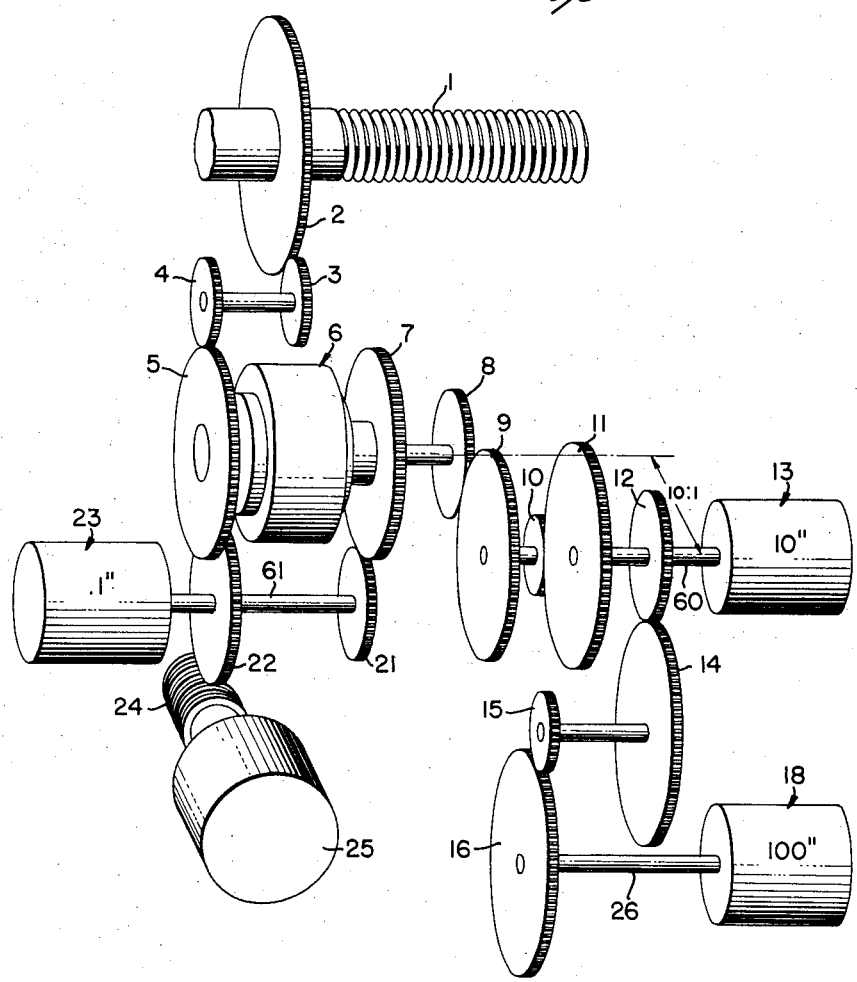

Fig. 2 is a perspective view of the data elements and gearing for use in the system of Fig. 1, the scale and slider of the linear element being omitted.

Referring in detail to the drawings, at the outset it should be understood that the system and apparatus of Figs. 1 and 2 pertain only to one axis of the machine which may be referred to as the X axis, an additional axis Y for two-dimensional operation, or two additional axes Y and Z for three-dimensional operation involving the use of apparatus substantially the same as that shown in Figs. 1 and 2 for each such additional axis.

As shown in Fig. 1, the positional command is indicated as a digital input 30 and a digital-to-analog converter therefor 31, although as above stated, other types of inputs may be employed. The phase sensitive amplifier DA-1 is energized over line 32 by oscillator OS-2 which also energizes the converter 31. The digital-to-analog converter has as outputs coarse, medium and fine increments represented at 34, 35 and 36 of the input data, each of which supplies sine and corresponding cosine values of the angle corresponding to the required operation of the coarse resolver 18, the medium resolver 13 and the slider 37 of the linear position measuring transformer 38 which has a stationary scale 39 as described above. The lead screw 1 of the machine drives the nut 40 to which is fixed the slider 37 carrying windings 41 and 42 arranged in space quadrature of the pole cycle of the single conductor winding 43 on the scale 39. The nut 40 represents the driven element of the machine which is to be positioned in accordance with the positional command of the digital input 30 or other input.

Resolver 18 has stationary space quadrature windings 44 and 45 to which are supplied currents corresponding to the sine and cosine of the angle to which the rotatable winding 46 will be driven by the lead screw 1, to null the servo motor 50.

The medium resolver 13 similarly has stationary space quadrature windings 51 and 52 and a rotatable winding 53 wherein the current is null when the winding 53 is rotated to the angle designated by the input, being sine and cosine currents of that angle.

In the case of the coarse resolver 18 and the medium resolver 13, the zero offset is added in mechanically, by rotating the rotary winding 46 of the former and the rotatable winding 53 of the latter by the amount selected for the zero offset. For this reason, the sine and cosine currents are led directly to the resolvers 18 and 13, while in the case of the fine position measuring transformer 38, the zero offset is added in electrically by the resolver 23, whereby the zero offset motor 25 is available to rotate the resolvers 23, 13 and 18, in proportion to their scale factors and as required for the zero offset.

The sine and cosine currents of the fine increment of the input are supplied to the stationary windings 54 and 55, the rotatable windings 56 and 57 supplying corresponding sine and cosine currents of the angle required by the fine increment 36, but of modified space phase depending on the zero offset angular adjustment thereof by the zero offset motor 25. The windings 56 and 57 are connected through suitable amplifiers indicated at SA-5 to the space quadrature windings 41 and 42 of the slider 37.

The gearing between the lead screw 1 and the coarse, medium and fine data elements 18, 13 and 38 and the pole pitch of the windings on the fine data element 38 may be such that the scale factors of the coarse, medium and fine data elements are as indicated in Fig. 1, namely 100 in. to 10 in. to .1 in., one revolution of each of the coarse, medium and fine data resolvers 18, 13 and 23 corresponding to the above mentioned respective travels of the nut 40, namely 100 in., 10 in., .1 in. respectively.

To simplify the showing, some of the gears in Fig. 2 have been omitted in Fig. 1, also the linear transformer 38 and nut 40 are not shown in Fig. 2, but are understood to be employed as shown in Fig. 1.

The position of lead screw 1 is transmitted to the medium resolver 13 through gears 2, 3, 4, 5, differential 6 and gears 8, 9, 10 and 11. The position of lead screw 1 is transmitted to the coarse resolver 18 from gear 12 through gears 14, 15 and 16.

The cage 17 of differential 6 is connected directly to gear 8, which in turn meshes with the medium resolver shaft 60 at a 10:1 ratio. Gear 8, on the spider 17, is the output gear of the differential 6, and this output is proportional to the sum, or difference of two inputs, one of which is from the machine via gear 5 which is fixed to bevel gear 26, the other input being via the zero offset motor 25, shaft 61 and gear 21 meshing with gear 7 fixed to bevel gear 27. Gear 8 thus has an output proportional to the sum or difference of its two inputs, the spider 17 having a scale value per revolution twice that of either end gear as described in page 12 of reprint from Machine Design, August, 1945 through February, 1946, entitled "Designing Computing Mechanisms" by Macon-Fry.

Suitable rotation of gears 7, acting through differential 6, will position or offset the shaft 60 of resolver 13 as desired with respect to the lead screw 1. Since the coarse resolver 18 is permanently geared to the medium resolver 13 through gears 12, 14, 15 and 16, the correct relative positions will be maintained of resolvers 13 and 18 in accordance with their 10 to 1 scale factors as shown.

The magnetic amplifier 19 is in circuit with the A.C. zero offset motor 25.

Gear 7 is driven by offset motor 25 through a non-reversible pair of gears 24 and 22, shaft 61 (for the rotary windings 56 and 57) and gear 21. Resolver 23 is an electrical differential in series with the fine data element 38 and is arranged to rotate once for each 0.1 in. advance of the machine, i.e., nut 40.

The rotation of gear 7 does not work back through the differential 6 to opperate the lead screw 1, since the frictional load on the lead screw 1 is large compared to the load imposed by the coarse and medium resolvers 18 and 13 and the gear train which drives them.

In Fig. 1, the gear ratio between the lead screw 1 and the shaft 20 of cage 17 is indicated as "x", as various leads may be obtained by selecting any desired ratio for "x", the relation with the gear ratio shown, being as follows:

| Ratio "x": | Lead, inch |
| --- | --- |
| 1:5 | .1 |
| 2:5 | .2 |
| 1:2 | .25 |
| 1:1 | .5 |

For normal operation, the switch 62 is moved to its alternate position, the error currents from the coarse, medium and fine data elements 18, 13 and 38 acting through the D.C. amplifier 63 and amplidyne 64 to operate the D.C. servo motor 50 which drives these data elements to a null position corresponding to the positional command of the input 30. The error current from resolvers 18 and 13 is supplied to amplifiers CA-2T, the error current from the fine data element 38 being supplied to amplifier EA-2. When the coarse error current is reduced to a value which can be handled by the medium and or fine data elements, the switch SW–1 connects in the switch SW–2 which likewise switches off the medium error current when the error current is reduced to a value which can be handled by the fine data element. These error currents as shown are supplied to the phase sensitive amplifier DA–1

When it is desired to offset the machine coordinates with respect to the program zero of the input 30, the switch 62 is moved to the position shown. Having initially zeroed the resolvers 18, 13 and 23 for any position, the zero offset is set in as follows:

(1) Position the workpiece on the machine at the desired location with respect to the spindle or tool.

(2) With main drive off, insert the command in the input 30 corresponding to this position of the work.

(3) Move switch 62 to position shown to connect motor 25 into the servo system in place of the servo drive motor 50.

(4) Allow motor 25 to drive to a position of zero error.

The zero offset is now set.

All three error signals operate at so called different "speeds" or under control of switches SW–1 and SW–2, which are similar to switch 125 in Fig. 16, S.N. 557,035, Patent 2,875,390, February 24, 1959, referred to later, and page 84, vol. 25 of "Radiation Laboratory Series," "Theory of Servo-Mechanisms," by James et al., published 1947 by McGraw-Hill Book Co. Pages 81–88 define "speed" and disclose a "synchronizing" circuit for dual-speed which may be used here.

Patent application S.N. 540,748, filed October 17, 1955, by R.W. Tripp for "Automatic Shaft Control" Patent 2,839,711, June 17, 1958, discloses and claims a computer for computing the sine and cosine values of an angle equal to the sum of the angles represented by the digits in decimally related digital groups which may be used in input 30. Said application also discloses and claims the feature of producing the co-function sine and cosine values of the angle in coarse and fine increments.

Patent 2,875,390, discloses and claims (a), a feed rate resolver for resolving the combined analog values of the various path elements into space quadrature drives for the machine X and Y elements, by using these analog values to control the shaft of a resolver having co-function outputs in the relation of sine and cosine, the latter being integrated with the feed rate for controlling the speed ratio of the X and Y machine drives, and (b), the item (a) together with a zero offset or an adjustable zero reference for the origin or reference position with respect to the X and Y orthogonal axes along which machine drives are relatively driven to obtain a cutting path referenced to such axes, whereby the position of each axis for the machine drive may be referred to any selected origin of coordinates, either within the machine or outside of it. The present invention deals with the more general case of any type of input or positional command. The extension of this control of the feed rate resolver to three dimensions is disclosed and claimed in application S.N. 608,024, filed September 5, 1956, by R. W. Tripp, for 3-Dimensional Control Method and System, now Patent 2,843,811, July 15, 1958. The above patents and patent applications are assigned to the assignee hereof.

Various other modifications may be made in the invention without departing from the spirit of the following claims. For example, various choices of ratio may be made for the coarse resolver which may include a coarse resolver such as a 400″ resolver driven by shaft 26 of resolver 18 through a 4:1 gear ratio.

I claim:

1. A machine tool control system comprising a data element having a positional command input, said data element having cooperating stationary and movable members, said movable members having alternative drives, one of which is derived from a machine element driven by a servo motor controlled by said data element and the other of which is derived from a zero offset motor for offsetting the zero reference of said positional command, and means for operating either one of said drives to the exclusion of the other drive.

2. A machine tool control system according to claim 1, said data element comprising a rotary resolver and said other drive comprising a mechanical rotary drive for said resolver.

3. A machine tool control system according to claim 1, a rotary electrical differential input for said data element, said other drive comprising means for operating said electrical differential.

4. A machine tool control system according to claim 1, said data element comprising a linear position measuring transformer having a slider connected to said machine element and having space quadrature windings, a rotary resolver having input space quadrature windings for receiving currents in the relation of sine and cosine from said positional command and having relatively rotatable space quadrature windings as input to the windings of said slider, said last mentioned drive comprising means for rotating the rotatable quadrature windings of said resolver.

5. In a machine tool control system comprising a position command for data elements driven by a machine and controlling a servo motor which drives the machine, said data elements having relatively coarse and fine position scale factors, the improvement which comprises a control member and motive means responsive to said data elements controlled by said control member for offsetting said data elements in proportion to their respective scale factors, said data elements each having cooperating stationary and movable members, and gearing connecting said movable members for operation thereof by said servo motor or by said motive means at relative speeds in said proportion.

6. A machine tool control system comprising a relatively coarse position measuring transformer type of data element, a driven machine element, a servo motor having a driving connection with said machine element, a differential gear having an input from said machine element and having an output to said coarse data element, a linear position measuring transformer type of fine data element for said driven machine element, said data elements controlling said servo motor, a rotary resolver having an input to said fine data element, a zero offset motor having a drive for said resolver and providing another input to said differential gear, and a positional command for said coarse data element and said resolver.

7. A machine tool control system comprising a rotary resolver data element having relatively stationary windings, a positional command for supplying currents in the relation of sine and cosine to said windings, said data element having a rotatable winding, a servo motor, a machine element driven by said motor, a drive from said machine element, a zero offset motor, switching means for connecting said rotary winding as an input to either said servo motor or said zero offset motor, a drive from said offset motor and means for operating said rotary winding by the combined effects of said drives.

8. A machine tool control system comprising position measuring transformer type of data elements geared together with the revolution scale of 10 to 1, a positional command input for said data elements, said data elements having alternative drives, one of which is derived from a machine element driven by a servo motor controlled by said data elements and the other of which is derived from a zero offset motor for offsetting the zero reference of said positional command, and means for operating one or the other of said drives.

9. A machine tool control system comprising a position measuring transformer type of data element having a positional command input, said data element having alternative drives, one of which is derived from a machine element driven by a servo motor controlled by said data element and the other of which is derived from a zero offset control for offsetting the zero reference of said positional command.

10. A machine tool control system comprising a position measuring transformer type of data element having a positional command input, said data element having combined drives, one of which is derived from a machine element driven by a servo motor controlled by said data element and the other of which is derived from a zero offset control for offsetting the zero reference of said positional command, and a differential gear device having said drives as inputs and having an output to said data element.

11. A machine tool control system comprising means providing an input command signal, a data element having stationary and movable members, said data element having an input from said supplying means, a servo motor and machine element driven thereby and a drive from said motor to said movable data member, means whereby said movable data member controls said motor to drive said machine element to a null position of said movable data member corresponding to the position determined by the signal of said supplying means, a separate motive means responsive to said data element and having a signal input from said supplying means for offsetting the position of said movable data member, and means for operating said servo motor in accordance with a signal of said supplying means subsequently to the offsetting of said motive means, whereby in such subsequent operation the position of said machine element is operated by said servo motor to a position which is correspondingly offset.

12. A machine tool control system comprising means providing an input command signal in a plurality of grades of scale factors, a corresponding plurality of grades of data elements each having stationary and movable members, said data elements each having an input from said supplying means, a servo motor and machine element driven thereby and a drive from said motor to said movable data members, means whereby said movable data members control said motor to drive said machine element to a null position of said movable data members corresponding to the position determined by the signal of said supplying means, said data elements having different scale factors respectively and gearing connecting said movable members for operation thereof at relative speeds in proportion to said scale factors, and a separate motive means responsive to said data elements and having a signal input from said supplying means for offsetting the position of said movable data members, and means for operating said servo motor in accordance with a signal from said supplying means subsequently to the offsetting of said motive means, whereby in such subsequent operation the position of said machine element is operated by said servo motor to a position which is correspondingly offset.

13. A machine control system comprising means providing an input command signal in a plurality of grades of scale factors, a corresponding plurality of grades of data elements each having stationary and movable members, said data elements each having a grade of input from said supplying means, switches for connecting an output signal from said data elements in sequence to one output, a servo motor for driving a machine element, one of said movable members being fixed to said machine element, and gearing connecting all of said movable members for operation at relative speeds corresponding to their scale factors, another motor for offsetting the null position of each of said movable members, and switching means for connecting said one output to control either said servo motor or said other motor.

14. A machine tool control system comprising a linear position measuring transformer type of data element having a positional command input, said data element having windings and alternative controls, one of which is a drive derived from a machine element driven by a servo motor controlled by said data element and the other of which is derived from a zero offset control for offsetting the zero reference of said positional command, said zero offset control comprising a rotary transformer having geometrically spaced input windings for receiving currents in corresponding trigonometric relation from said positional command input, said rotary transformer having relatively rotatable geometrically spaced output windings as an input to said windings of said date element, and a drive for rotating the rotatable windings of said transformer.

15. A machine tool control system comprising a plurality of grades of position measuring transformer type of data elements each having a positional command input from a corresponding one of the plurality of grades of scale factors of a command signal input, each of said data elements having stationary and movable members, switches for connecting an output signal from said data elements alternatively to an output leading to a servo motor, said data elements having alternative controls, one of which is a drive derived from a machine element driven by said servo motor controlled by said data elements and the other of which is derived from a zero offset control for offsetting the zero reference of said positional command, said zero offset control comprising means for offsetting the null position of said movable members.

References Cited in the file of this patent

UNITED STATES PATENTS

| | | |
|---|---|---|
| 2,798,992 | Alder, et al. | July 9, 1957 |
| 2,840,771 | Kamm | June 24, 1958 |